United States Patent
Hsieh et al.

(10) Patent No.: US 9,171,229 B2
(45) Date of Patent: Oct. 27, 2015

(54) VISUAL OBJECT TRACKING METHOD

(71) Applicant: MING CHUAN UNIVERSITY, Taipei (TW)

(72) Inventors: Chaur-Heh Hsieh, Taipei (TW); Shu-Wei Chou, Taipei (TW)

(73) Assignee: Ming Chuan University, Taipei (TW)

( * ) Notice: Subject to any disclaimer, the term of this patent is extended or adjusted under 35 U.S.C. 154(b) by 121 days.

(21) Appl. No.: 14/184,829

(22) Filed: Feb. 20, 2014

(65) Prior Publication Data

US 2015/0117706 A1   Apr. 30, 2015

(30) Foreign Application Priority Data

Oct. 28, 2013   (TW) .............................. 102138843 A

(51) Int. Cl.
    *G06K 9/00* (2006.01)
    *G06K 9/62* (2006.01)
    *G06K 9/46* (2006.01)
    *G06T 7/40* (2006.01)
    *H04N 5/225* (2006.01)

(52) U.S. Cl.
    CPC .......... *G06K 9/6202* (2013.01); *G06K 9/00624* (2013.01); *G06K 9/4647* (2013.01); *G06T 7/408* (2013.01)

(58) Field of Classification Search
    CPC .................................. G06K 9/00; G06T 7/00
    USPC .......... 382/103, 107, 236; 348/169, 170, 171, 348/172, 352
    See application file for complete search history.

(56) References Cited

U.S. PATENT DOCUMENTS

6,363,160 B1 * 3/2002 Bradski et al. ................ 382/103

* cited by examiner

*Primary Examiner* — Abolfazl Tabatabai
(74) *Attorney, Agent, or Firm* — Rosenberg, Klein & Lee

(57) ABSTRACT

A visual object tracking method includes the steps of: setting an object window having a target in a video image; defining a search window greater than the object window; analyzing an image pixel of the object window to generate a color histogram for defining a color filter which includes a dominant color characteristic of the target; using the color filter to generate an object template and a dominant color map in the object window and the search window respectively, the object template including a shape characteristic of the target, the dominant color map including at least one candidate block; comparing the similarity between the object template and the candidate block to obtain a probability distribution map, and using the probability distribution map to compute the mass center of the target. The method generates the probability map by the color and shape characteristics to compute the mass center.

11 Claims, 6 Drawing Sheets

VISUAL OBJECT TRACKING METHOD

FIELD OF THE INVENTION

The present invention relates to a visual object tracking method, in particular to the visual object tracking method using both color and shape characteristics to compute the center coordinates of a target accurately.

BACKGROUND OF THE INVENTION

Video tracking plays a very important role in computer vision and has extensive applications in the fields of video surveillance, man-machine interface, automobile navigation and intelligent transport system. However, the practical applications of the video tracking technology still have many technical difficulties including complicated background, non-rigid object, illumination change or masked object, and these technical issues make the visual object tracking very difficult, and both stability and accuracy of the tracked object will be affected by the aforementioned technical issues. Nonetheless, video tracking primarily analyzes and processes information of the characteristics such as the color, shape and lines of an object continuously to estimate the center position and size of a target to achieve the tracking effect.

At present, there are many different tracking algorithms available in the market, and the features of these algorithms are different, wherein Mean Shift algorithm is a highly efficient visual object tracking method, and CamShift algorithm switches the Mean Shift algorithm to be adaptive and automatically adjusts the size of an object window in order to fit the size of the object that changes with time, and the CamShift algorithm is a highly efficient and stable target tracking method and thus capturing extensive attention.

However, CamShift is an improved algorithm of Mean shift. Although CamShift is a high-speed algorithm, it mainly uses a color characteristic as the basis of tracking. Since the computation method is to convert the similarity of colors into probability and then calculate the mass center from the probability. If a target has a background with similar colors or a larger object with similar colors, the tracking of the original object will be interfered to cause a failure of tracking. In other words, this algorithm simply using the similarity of colors to calculate probability is often interfered by other larger objects or the background having similar colors of a target, and misjudgments or errors of the object tracking occur frequently.

In view of the problems above, the inventor of the present invention based on years of experience in the related industry to conduct extensive researches and experiments, and finally invented a visual object tracking method in accordance with the present invention to overcome the foregoing problems.

SUMMARY OF THE INVENTION

Therefore, it is a primary objective of the present invention to overcome the technical issues of the conventional tracking algorithms, in particular, the CamShift algorithm that simply converts the similarity of colors into probability to compute the mass center, and if the target is situated in a background having similar colors or large objects having similar colors are existed around the target, then the object tracking result will be affected, and failures and errors may occur very often. In other words, the conventional tracking algorithms have the drawbacks of poor stability and accuracy.

To achieve the aforementioned objective, the present invention provides a visual object tracking method comprising the steps of: setting an object window having a target in a video image; defining a search window greater than the object window; analyzing an image pixel of the object window to generate a color histogram for defining a color filter, wherein the color histogram defines a color filter, and the color filter includes a dominant color characteristic of the target; using the color filter in the object window to generate an object template, wherein the object template, includes a shape characteristic of the target; using the color filter the search window to generate a dominant color map in, wherein the dominant color map includes at least one candidate block; comparing the similarity between the object template and the candidate block to obtain a probability distribution map; and using the probability distribution map to compute the mass center of the target.

The visual object tracking method further comprises the steps of adjusting the mass center of the target by a mean shift algorithm to obtain the best center position of the target; and updating the size of the search window according to the best center position.

Wherein, the object window is selected and obtained manually in the step of setting an object window in a video image.

Wherein, the object window is obtained by pre-loading an image and computing the image in the step of setting an object window in a video image.

Wherein, the object window is situated at the center of the search window in the step of setting a search window.

Wherein, the video image is converted into a HSV color space.

Wherein, the object template and the dominant color map are binary images.

Compared with the prior art that uses color characteristic as the basis of tracking and fails to distinguish different objects of the same color, the present invention mainly uses the color filter and can use both color and shape characteristics of the target as the basis of tracking to obtain the mass center of the target effectively. Further, the mean shift algorithm is used to adjust the mass center and update the size of the search window, so that the present invention can achieve the effects of improving the stability and accuracy of the recognition, lowering the total operation cost, and achieving the timely tracking effect.

DESCRIPTION OF THE PREFERRED EMBODIMENTS

The aforementioned and other objectives and advantages of the present invention will become clearer in light of the following detailed description of an illustrative embodiment of this invention described in connection with the drawings. It is intended that the embodiments and drawings disclosed herein are to be considered illustrative rather than restrictive.

The processes, features, or functions of the present invention can be implemented by program instructions that perform in an appropriate computing device. With reference to FIGS. 1 to 6 for a visual object tracking method of the present invention, the visual object tracking method comprises the following steps:

capture a sequence of video images by a video camera, wherein the background scene may be changing or said video camera may be moving;

establish a computer having a processor in connection with said video camera, said processor being configured for:

Set an object window 100 in one of video images, and the object window 100 has a target, and the object window 100 is selected and obtained manually, or obtained by pre-loading an image and then computing the image. In addition, the video image is converted into a HSV color space 200. In this preferred embodiment, a user is assumed to select the object window 100 manually and set the size of the object window 100 to w×h.

Defines a search window 101 with a size greater than the object window 100, wherein the object window 100 is disposed at the center of the search window 101, wherein the size of the search window 101 is assumed to (s×w)×(s×h), and s is the magnification ratio, and the magnification ratio is set to 1.3.

Figure 1:
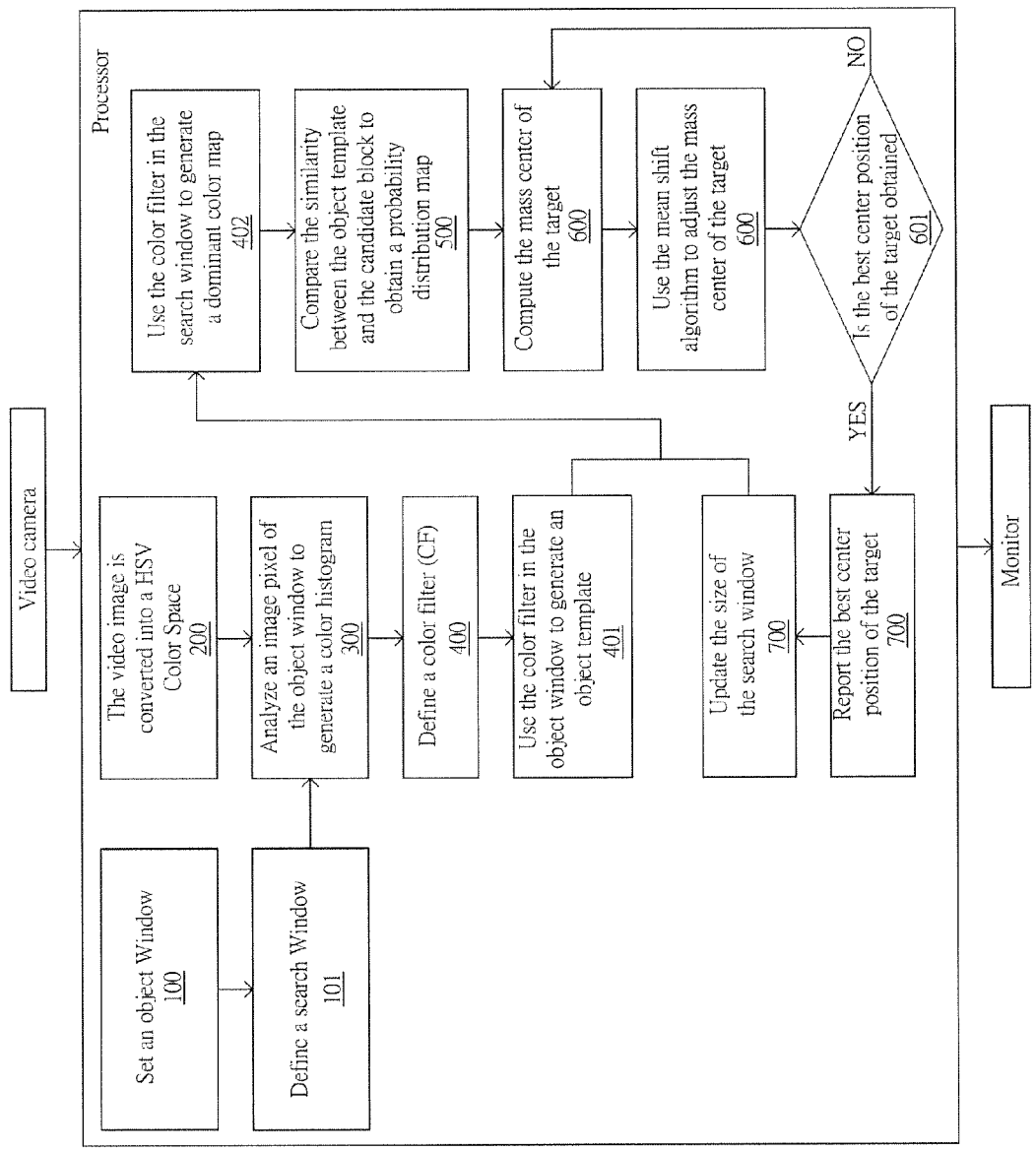
FIG. 1 is a flow chart of the present invention.
Figure 2:
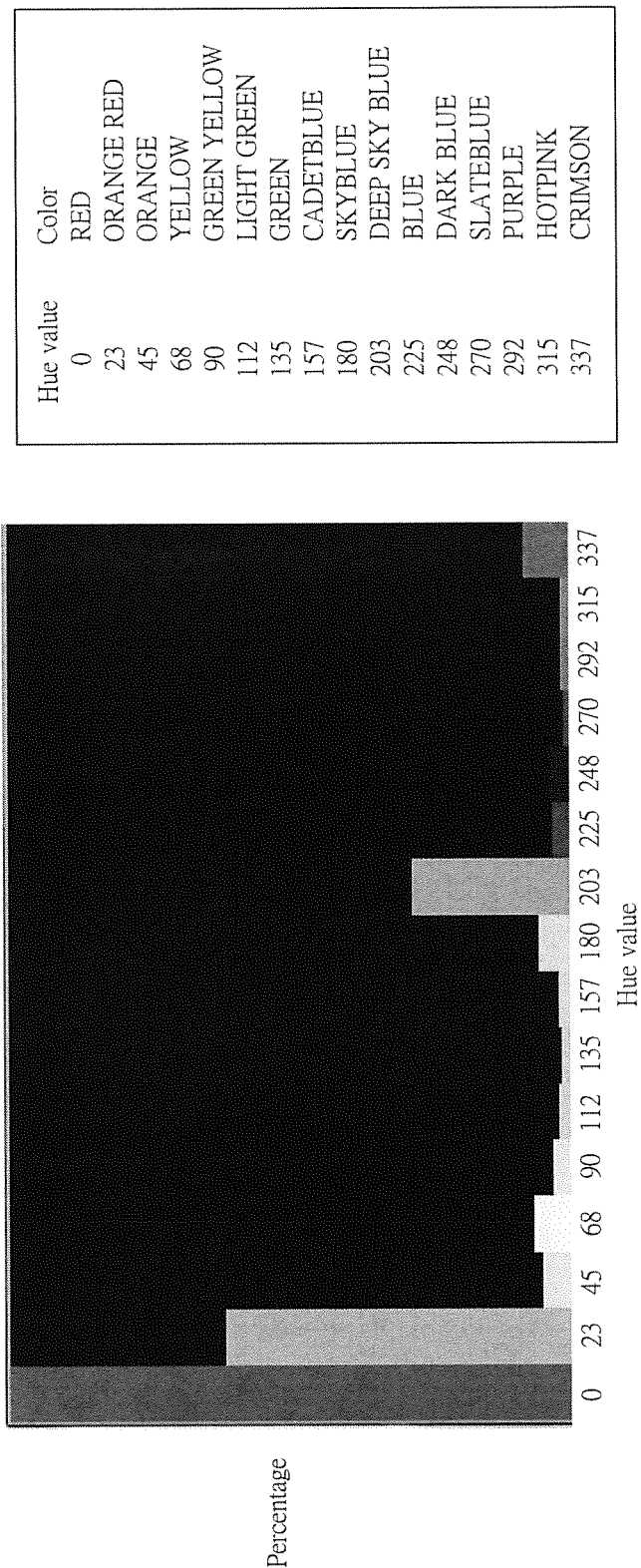
FIG. 2 is a color histogram of the present invention.

Analyze an image pixel x of the object window 100 to generate a color histogram 300, and the color histogram 300 as shown in FIG. 2 is divided into N bins and used for defining a color filter (CF) 400, and the color filter 400 is divided into M bins (M<N), and the mathematical equation 1 is given below.

$$CF(k) = \begin{cases} 1, & k \text{ belongs to a defined dominant color.} \\ 0, & k \text{ does not belong to a defined dominant color.} \end{cases} \quad \text{Mathematical Equation 1}$$

Figure 3:
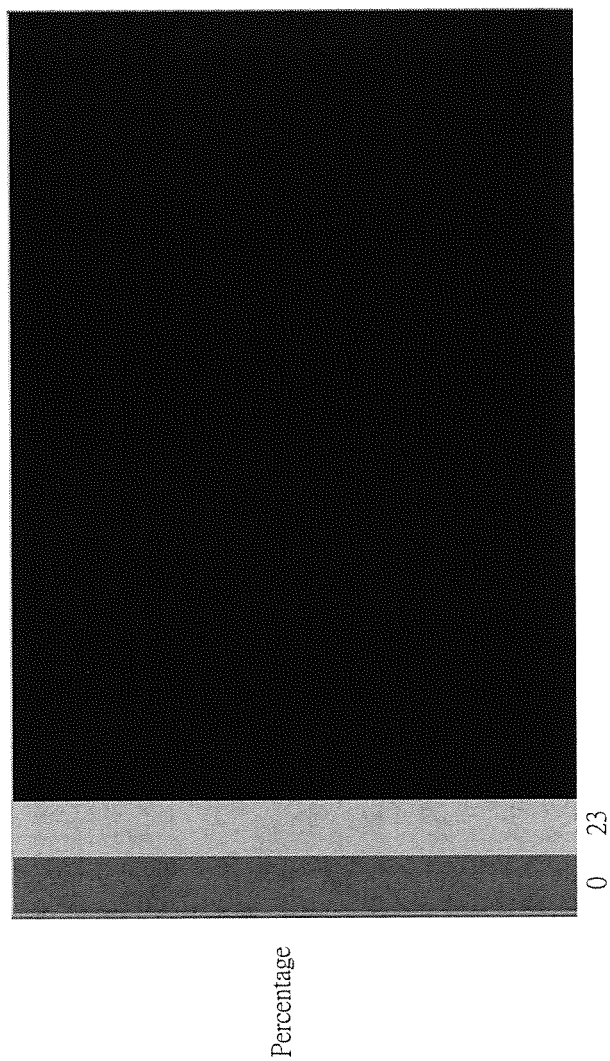
FIG. 3 is a schematic view a color filter of the present invention.

With reference to FIG. 3, M is set to be 2, and the color filter 400 includes a dominant color characteristic of the target. One of skilled person in the art will understand that the color histogram, as shown in FIGS. 2 and 3, contains both percentage and Hue to cover the representative color image pixels.

Use the color filter 400 in the object window 100 to analyze each image pixel x(i,j) of the object window 100 to produce an object template (O) 401, and its related mathematical equation 2 is given below:

$$O(i, j) = \begin{cases} 1, & \text{if } CF(k) = 1 \text{ for } x(i, j) \\ 0, & \text{if } CF(k) = 0 \text{ for } x(i, j) \end{cases} \quad \text{Mathematical Equation 2}$$

Figure 4:
FIG. 4 is a schematic view an object template of the present invention.

The object template 401 is a binary image. From O(i,j)=1 as shown in the mathematical equation 2, the color of the image pixel at the position (i,j) matches with the dominant color characteristic. In FIG. 4, the object template 401 includes a shape characteristic of the target.

Figure 5:
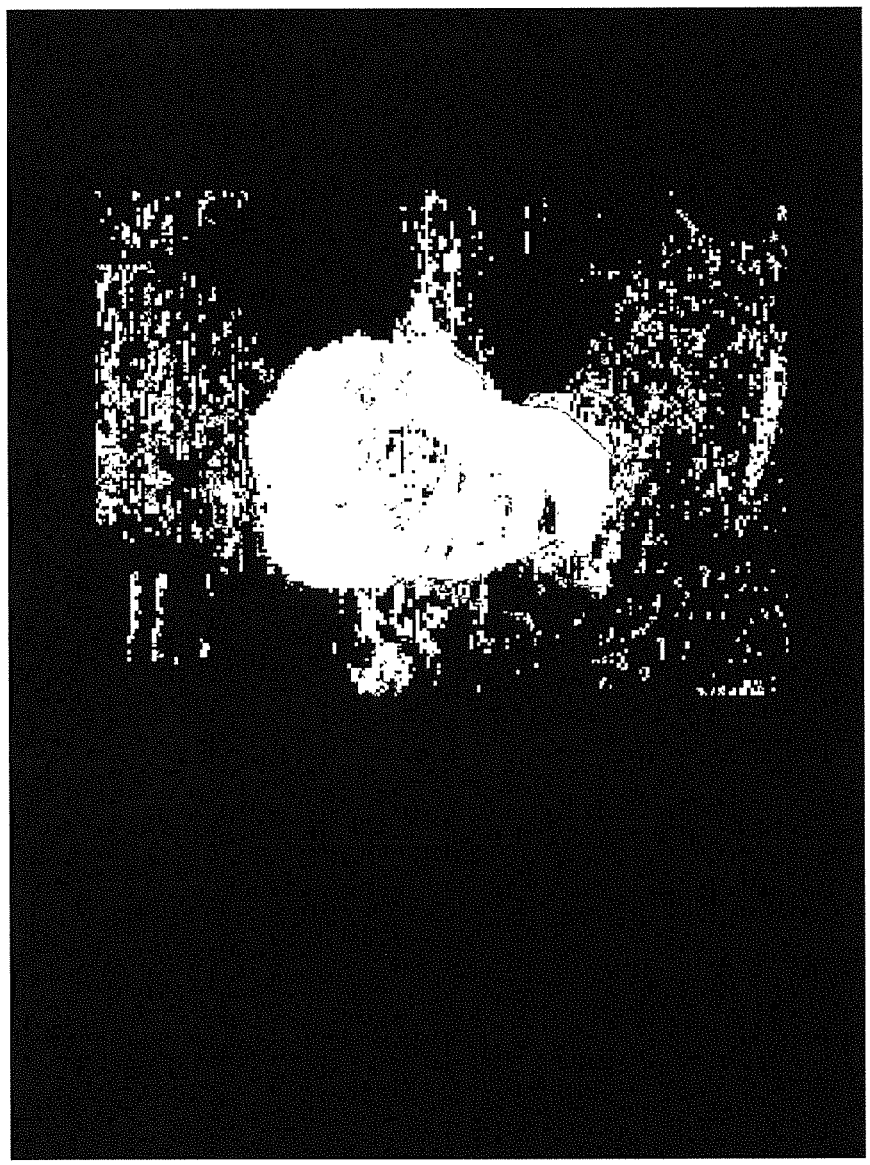
FIG. 5 is a schematic view of dominant colors of the present invention.

Generate a dominant color map 402 (as shown in FIG. 5) in the search window 101 by the color filter 400, wherein the dominant color map 402 is a binary image, and the dominant color map 402 has at least one candidate block (C), and the size of the candidate block must be equal to the size of the object template 401 (which is w×h). For example, if the size of the search window 101 is set to 60×60 pixels, and a pixel distance of the candidate block is defined. In other words, a candidate block is produced in every 10 pixel distances, wherein the pixel distance is simply provided to facilitate the computation by the computer, but the present invention is not limited to such arrangement.

Compare the similarity between the object template 401 and the candidate block to obtain a probability distribution map 500, and mathematical equation 3 and mathematical equation 4 are given below:

$$S(O, C) = \sum O(i, j) \oplus C(i, j) \quad \text{Mathematical Equation 3}$$

$$P(m, n) = \frac{S(O, C)}{w \times h} \quad \text{Mathematical Equation 4}$$

Wherein, ⊕ represents inversion of Exclusive OR, and (m,n) represents the position of the candidate block.

Figure 6:
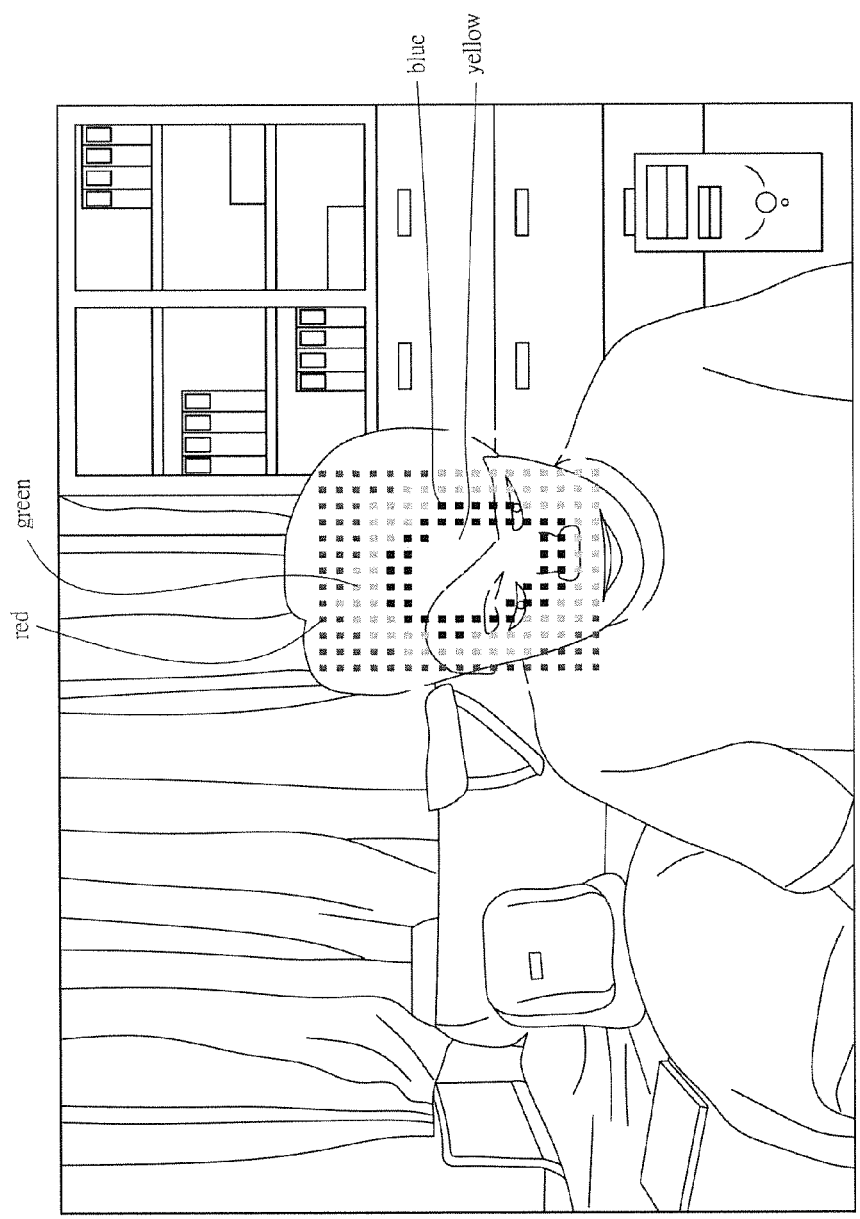
FIG. 6 is a schematic view of a probability distribution of the present invention.

With reference to the probability distribution map 500 as shown in FIG. 6, different probability values are shown by different colors. The closer position to the center of the target, the greater the probability value. The farther from the center of the target, the smaller the probability value. Since the pixel distance of this preferred embodiment is set to 10 pixels, the probability of the candidate block corresponding to its pixel range is (−5~+5).

According to the probability distribution map 500, the mean shift algorithm is used to adjust the mass center of the target 600 and determine whether the best center position of the target 601 is obtained; if no, then the previous step is repeated to obtain the mass center of the target 600 again, or else the next step is executed.

The size of the search window 700 is updated according to the best center position for tracking the target continuously. After the size of the search window 700 is updated, the same procedure is applied to another video image. After the search window 700 is updated, the color filler is used to achieve the effect of tracking the target accurately and stably. By the way, said computer is further connected to a monitor for displaying the sequence of video images and the probability distribution map 500 at the same time. The probability distribution map 500 can be represented not only by colorful-dotted pattern but also a circle or rectangle frame (e.g. the yellow circle frame in FIG. 6). No matter how it is represented, the probability distribution 500 is modified to show the tracking results of said computer analysis.

From the aforementioned description and arrangement, the object template is produced in the object window by the color filter, and the dominant color map is produced in the search window, so that both dominant color and shape characteristics of the target can be obtained. In addition, the dominant color map has the pre-defined candidate block, and the similarity between the candidate block and the object template is compared to obtain the probability distribution map, and the mass center of the target can be obtained from the probability distribution map effectively. Further, a mean shift algorithm is used to adjust the mass center and update the size of the search window, so that the present invention can overcome the interference issue of having objects with similar colors in a video background, so as to achieve the advantages and effects of improving the stability and accuracy of recognition, lowering the total operation cost, and accomplishing the timely tracking.

In summation of the above description, the present invention herein improves over the prior art and further complies with the patent application requirements and is duly submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A visual object tracking method, comprising the steps of:
establishing a computer having processor, said processor being configured for:
setting an object window having a target in a video image;
defining a search window greater than the object window;
analyzing an image pixel of the object window to generate a color histogram, wherein the color histogram defines a color filter (CF), and the color filter includes a dominant color characteristic of the target;
using the color filter in the object window to generate an object template (O), wherein the object template includes a shape characteristic of the target;
using the color filter in the search window to generate a dominant color map, wherein the dominant color map includes at least one candidate block (C);
comparing the similarity between the object template and the candidate block to obtain a probability distribution map; and
using the probability distribution map to compute the mass center of the target.

2. The visual object tracking method of claim 1, further comprising the steps of: adjusting the mass center of the target by a mean shift algorithm to obtain the best center position of the target; and updating the size of the search window according to the best center position.

3. The visual object tracking method of claim 1, wherein the object window is selected and obtained manually in the step of setting an object window in a video image.

4. The visual object tracking method of claim 1, wherein the object window is obtained by pre-loading an image and computing the image in the step of setting an object window in a video image.

5. The visual object tracking method of claim 1, wherein the object window is situated at the center of the search window in the step of setting a search window.

6. The visual object tracking method of claim 1, wherein the color histogram is divided into N bins, and the color filter is divided into M bins, and M is smaller than N in the step of defining a color filter by using a color histogram, and the mathematical equation of the color filter (CF) is:

$$CF(k) = \begin{cases} 1, & k \text{ belongs to a defined dominant color.} \\ 0, & k \text{ does not belong to a defined dominant color.} \end{cases}$$

7. The visual object tracking method of claim 6, wherein the color filter is analyzed based on each image pixel $x(i,j)$ of the object window in the step of using the color filter to generate an object template in the object window, and the mathematical equation of the object window is:

$$O(i, j) = \begin{cases} 1, & \text{if } CF(k) = 1 \text{ for } x(i, j) \\ 0, & \text{if } CF(k) = 0 \text{ for } x(i, j) \end{cases}.$$

8. The visual object tracking method of claim 7, wherein the following mathematical equation is used to compare the similarity between the object template and the candidate block in the step of comparing the similarity between the object template and the candidate block: $S(O,C)=\Sigma O(i,j) \oplus C(i,j)$, and $\oplus$ is inversion of Exclusive OR.

9. The visual object tracking method of claim 8, wherein the probability distribution map is obtained by the mathematical equation of $$P(m, n) = \frac{S(O, C)}{w \times h}$$

in the step of obtaining a probability distribution map, and (m,n) represents the position of the candidate block, and w×h represents the size of the object window.

10. The visual object tracking method of claim 1, wherein the video image is converted into a HSV color space.

11. The visual object tracking method of claim 1, wherein the object template and the dominant color map are binary images.

* * * * *